(12) United States Patent
Xun et al.

(10) Patent No.: US 10,023,071 B2
(45) Date of Patent: Jul. 17, 2018

(54) TRAIN CONTROL METHOD FOR MAXIMIZING UTILIZATION OF REGENERATIVE ENERGY

(71) Applicant: Beijing Jiaotong University, Beijing (CN)

(72) Inventors: Jing Xun, Beijing (CN); Bin Ning, Beijing (CN); Tao Tang, Beijing (CN); Tong Liu, Beijing (CN); Tianzhi Wang, Beijing (CN)

(73) Assignee: Beijing Jioatong University, Beijing (CN)

( * ) Notice: Subject to any disclaimer, the term of this patent is extended or adjusted under 35 U.S.C. 154(b) by 24 days.

(21) Appl. No.: 15/221,737

(22) Filed: Jul. 28, 2016

(65) Prior Publication Data

US 2017/0057378 A1    Mar. 2, 2017

(30) Foreign Application Priority Data

Aug. 25, 2015    (CN) .......................... 2015 1 0527621

(51) Int. Cl.
| | | |
|---|---|---|
| G05D 1/00 | (2006.01) |
| B60L 15/00 | (2006.01) |
| B61C 3/00 | (2006.01) |
| B61C 15/00 | (2006.01) |
| B60L 15/20 | (2006.01) |

(Continued)

(52) U.S. Cl.
CPC .............. *B60L 15/002* (2013.01); *B60L 15/20* (2013.01); *B61C 3/00* (2013.01); *B61C 15/00* (2013.01); *B61L 3/006* (2013.01); *B61L 3/008* (2013.01); *B61L 27/0016* (2013.01);
(Continued)

(58) Field of Classification Search
CPC .... B60L 15/002; B60L 15/20; B60L 2200/26; B61C 3/00; B61C 15/00; B61L 3/006; B61L 3/008; B61L 27/0016; B61L 27/0027; B61L 27/0038; Y02T 10/7258
USPC .................. 701/19, 20, 23; 246/26; 320/167; 702/62
See application file for complete search history.

(56) References Cited

U.S. PATENT DOCUMENTS

| 8,831,801 B1* | 9/2014 | Raghunathan | .......... G06F 17/11 |
| | | | 700/291 |
| 2014/0277861 A1* | 9/2014 | Raghunathan | .......... B61L 99/00 |
| | | | 701/19 |

(Continued)

FOREIGN PATENT DOCUMENTS

| CN | 103661434 A | 3/2014 |
| CN | 103738367 A | 4/2014 |

(Continued)

*Primary Examiner* — Shardul D Patel
(74) *Attorney, Agent, or Firm* — Stites & Harbison, PLLC; David W. Nagle, Jr.

(57) ABSTRACT

Embodiments of the present invention provide a train control method for maximizing utilization of regenerative energy. The method mainly comprises: working out a matching error ΔT of a current matched pair of trains Mx (i, j) of a station in the current running situation; and comparing the matching error ΔT with a preset maximum adjustable error $ΔT_x$ of the current matched pair of trains Mx (i, j) of the station and determining a strategy for adjusting train running of the current matched pair of trains Mx (i, j) according to comparison results.

4 Claims, 4 Drawing Sheets

(51) Int. Cl.
*B61L 3/00* (2006.01)
*B61L 27/00* (2006.01)

(52) U.S. Cl.
CPC ....... *B61L 27/0027* (2013.01); *B61L 27/0038* (2013.01); *B60L 2200/26* (2013.01); *Y02T 10/7258* (2013.01)

(56) References Cited

U.S. PATENT DOCUMENTS

2016/0001799 A1* 1/2016 Cook ..................... B61H 11/00
 105/35
2016/0347204 A1* 12/2016 Takigawa ................ B61L 3/006

FOREIGN PATENT DOCUMENTS

CN 104401370 A 3/2015
JP 2014144754 A 8/2014

* cited by examiner

TRAIN CONTROL METHOD FOR MAXIMIZING UTILIZATION OF REGENERATIVE ENERGY

CROSS-REFERENCE TO RELATED APPLICATIONS

The present disclosure is based upon and claims priority to Chinese Patent Application No. 201510527621.X, filed on Aug. 25, 2015, the entire contents of which are incorporated herein by reference.

FIELD OF TECHNOLOGY

The present invention relates to the technical field of train control, and in particular relates to a train control method for maximizing utilization of regenerative energy.

BACKGROUND

In recent years, with the rapid development of urban rail transit, energy saving in urban rail transit systems has attracted attention. The energy consumption of a rail transit system includes power used in dynamic electricity controlling and lighting and power used in train traction. Power used in train traction is reduced mainly by two methods: one is a single-train energy-saving operation method in which a single train is taken as the object to be controlled, so as to optimize the strategy for driving the train between stations; the other is a train group optimization control method in which maximizing utilization of regenerative energy is taken as the optimization objective.

Regenerative energy comes from regenerative braking. Regenerative braking is a technique of converting the kinetic energy of a vehicle into electric energy. The converted electric energy may be fully used by reasonably arranging the sequence of train traction/braking in a train group. In urban rail transit, it is easy for up trains and down trains near the same station to form a scene on which one train is braking while the other is in a traction state. The two trains forms a matched pair of trains, and regenerative energy may be fully used by adjusting the running strategy of the matched pair of trains.

The optimization of train control often focuses on optimizing the running profile of a single train or a train group, and people fail to provide a train control method for maximizing utilization of regenerative energy by optimizing the running profiles for the matched pair of trains at the same station.

SUMMARY

Embodiments of the present invention provide a train control method for maximizing utilization of regenerative energy, so as to maximize utilization of regenerative energy of a matched pair of trains.

The object of the present invention is achieved by the following technical solutions:

The present invention provides a train control method for maximizing utilization of regenerative energy, including:

working out a matching error $\Delta T$ of a current matched pair of trains Mx (i, j) of a station in the current running situation; and comparing the matching error $\Delta T$ with a preset maximum adjustable error $\Delta T_x$ of the current matched pair of trains Mx (i, j) of the station, and determining a strategy for adjusting train running of the current matched pair of trains Mx (i, j) according to comparison results.

Preferably, the step before working out a matching error $\Delta T$ of a current matched pair of trains Mx (i, j) of a station in the current running situation further includes:

determining a set of all matched pairs of trains M={Mx, x=1, ..., N} according to a train diagram of each train, wherein each matched pair of trains Mx (i, j) includes a train i and a train j, and within a matching time $T_{match}$, one of the train i and train j leaves a station n and performs an operation of train traction while the other reaches the station n and performs an operation of train braking; and presetting the maximum adjustable error $\Delta T_x$ of each matched pair of trains according to the train diagrams of the train i and train j in each matched pair of trains Mx (i, j) and maximum running speeds of the train i and train j, wherein the maximum adjustable error $\Delta T_x$ is determined according to the shortest periods of time in which the trains i and j run respectively between stations.

Preferably, the step of working out a matching error $\Delta T$ of a current matched pair of trains Mx (i, j) of a station in the current running situation further includes:

Working out a theoretical matching time $T_{match}$ of the current matched pair of trains Mx (i, j) of the station in the current running situation:

$$T_{match} = T_2 - T_1$$

where $T_2$ is the ending moment of regenerative braking of the reaching train, and $T_1$ is the starting moment of traction of the leaving train; and working out a matching error $\Delta T$ between the matching time of the matched pair of trains Mx (i, j) and the theoretical matching time $T_{match}$ according to the current running situation of the matched pair of trains Mx (i, j);

$$\Delta T = T_{match} - T'_{match}$$

where $T'_{match}$ is matching time of two matched trains at a matching station, which is predicted according to the current actual running state of the matched pair of trains Mx (i, j).

Preferably, the step of comparing the matching error $\Delta T$ with a preset maximum adjustable error $\Delta T_x$ of the current matched pair of trains Mx (i, j) of the station and determining a strategy for adjusting train running of the current matched pair of trains Mx (i, j) according to comparison results includes:

comparing the matching error of the matched pair of trains Mx (i, j) in the current running situation with the preset maximum adjustable error $\Delta T_x$ of the current matched pair of trains Mx (i, j) of the station, and when, $\Delta T \le \Delta T_j$, adjusting the running situation of the current matched pair of trains Mx (i, j) according to the set strategy for adjusting train running; and when $\Delta T > \Delta T_j$, deleting the matched pair of trains Mx (i, j) from the set M, and not adjusting the train running of the matched pair of trains Mx (i, j).

Preferably, the step of adjusting the running situation of the current matched pair of trains Mx (i, j) according to the set strategy for adjusting train running includes:

not adjusting the traction process of the leaving train in the current matched pair of trains Mx (i, j), and instead determining the starting moment and ending moment of braking of the reaching train after adjustment according to the matching error $\Delta T$ and the maximum adjustable error $\Delta T_x$; and acquiring a train running speed curve of the current matched pair of trains Mx (i, j) within the matching time according to the line parameters, train parameters and train diagram of the current matched pair of trains Mx (i, j), and the starting moment and ending moment of braking of the reaching train after adjustment.

It may be seen from the technical solutions provided by the embodiments of the present invention that in the present invention, a strategy for adjusting train running of the current matched pair of trains Mx (i, j) is determined according to the results of comparing the matching error ΔT with the preset maximum adjustable error $\Delta T_x$ by working out the matching error ΔT of the current matched pair of trains Mx (i, j) of the station in the current running situation. The present invention provides a train control method for maximizing utilization of regenerative energy, by which a strategy for adjusting train control may be produced in real time according to the train running situation, especially the deviation of the matched pair of trains, the train running speed curve of the matched pair of trains may thus be adjusted, and as a result the utilization of regenerative energy of the matched pair of trains may be maximized, so as to increase the utilization ratio of regenerative energy generated by train braking in urban rail transit and reduce the energy consumption of urban rail transit systems.

Additional aspects and advantages of the present invention will be partially given in the following description, and these will become apparent from the following description or be learned by practice of the present invention.

BRIEF DESCRIPTION OF THE DRAWINGS

In order to more clearly illustrate the technical solutions in the embodiments of the present invention, a brief introduction about the accompanying drawings to be used for illustration of the embodiments will be given below. Apparently, the accompanying drawings illustrated below are merely some of the embodiments of the present invention, based on which other drawings may be obtained by those of ordinary skill in the art without creative efforts.

DESCRIPTION OF THE EMBODIMENTS

Implementations of the present invention will be described in detail below; examples of the implementations are shown in the accompanying drawings, throughout which the same or similar reference numerals refer to the same or similar elements or elements having the same or similar functions. The implementations described below with reference to the accompanying drawings are exemplary only for explaining the present invention and should not be construed as limiting the present invention.

It may be understood by those skilled in the art that, unless specified otherwise, the singular forms 'a', 'an', 'said' and 'the' used herein shall be construed to include the plural. It should be further understood that the term 'comprises/comprising' used in the specification of the present invention is taken to specify the presence of stated features, integers, steps, operations, elements and/or components, but does not preclude the presence or addition of one or more other features, integers, steps, operations, elements, components and/or groups thereof. It should be understood that when it is said that an element is 'connected' or 'coupled' to another element, it can be directly connected or coupled to the other element or intervening elements may be present. In addition, as used herein, 'connected' or 'coupled' may include wirelessly connection or coupling. As used herein, the terminology 'and/or' includes any unit of and a combination of all of one or more associated listed items.

Those skilled in the art will appreciate that, unless defined otherwise, all terms (including technical and scientific terms) used herein have the same meaning as generally understood by those of ordinary skill in the art to which the present invention pertains. It should also be understood that generic terms such as those defined in the dictionary should be understood to have a meaning consistent with that in the context of the prior art, and unless defined as here, the generic terms will not be explained ideally or too formally.

To facilitate understanding of the embodiments of the present invention, several specific embodiments will be taken as examples for further explanation with reference to the accompanying drawings, and the various embodiments are not intended to limit the embodiments of the present invention.

Embodiment 1

Figure 1:
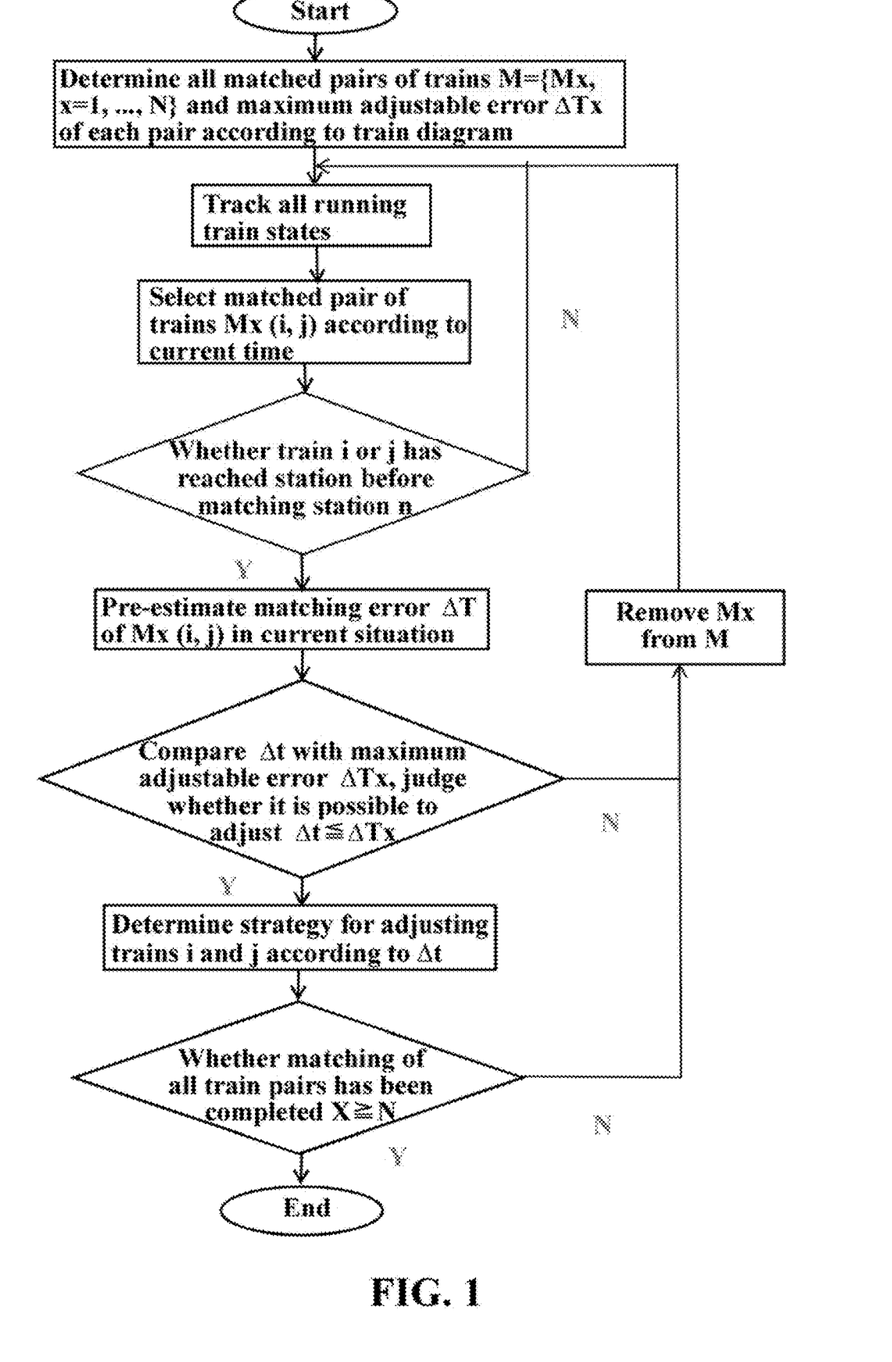
FIG. 1 is a processing flowchart of a train control method for maximizing utilization of regenerative energy as provided by an embodiment of the present invention.
Figure 2:
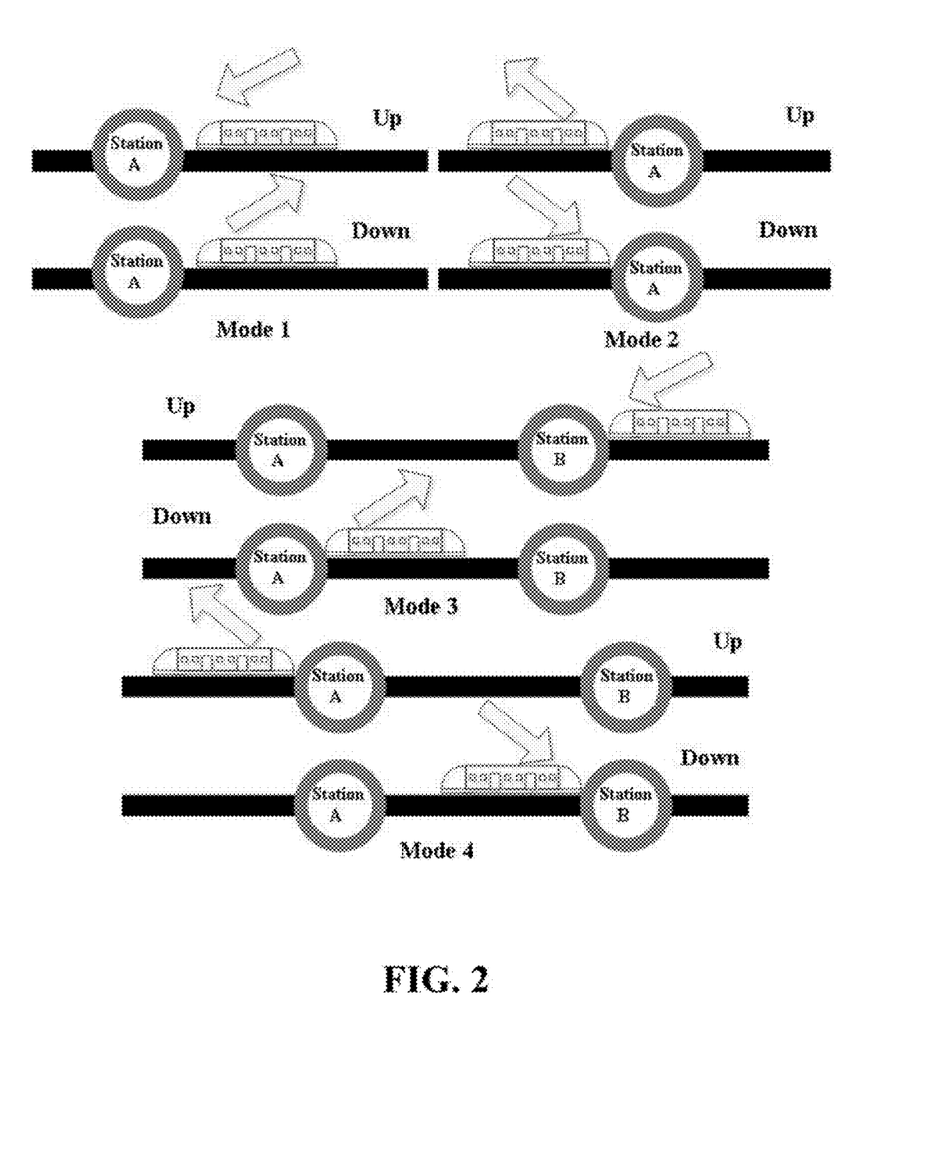
FIG. 2 is a schematic diagram of a mode of two-train braking-traction matching in urban rail transit as provided by an embodiment of the present invention.

The embodiment of the present invention provides a train control method for maximizing utilization of regenerative energy. As shown in FIG. 1, the processing flow of the method includes the following steps:

Step 1, determining all matched pairs of trains M={Mx, x=1, . . . , N} according to a train diagram, and presetting a maximum adjustable error $\Delta T_x$ of each matched pair of trains.

there are 4 common modes of two-train braking-traction matching in urban rail transit, as shown in FIG. 2.

Mode 1: at the same station, an up train is braking while a down train is in a traction state;

Mode 2: at the same station, an up train is in a traction state while a down train is braking;

Mode 3: at adjacent stations, an up train is braking while a down train is in a traction state;

Mode 4: at adjacent stations, an up train is in a traction state while a down train is braking.

For the train matching of non-adjacent stations, since the distance is relatively long, transmission loss of regeneration energy is relatively big, and the utilization ratio is usually not high. Meanwhile, compared with the case of the same station, there is a relatively long spatial distance between the adjacent stations. Therefore, modes 1 and 2 are recommended in urban rail transit.

The starting time and ending time of braking/traction of the train are determined based on the speed-position curve of train running between stations, it's determined that there are up trains and down trains with an overlapping time at the same station based on the above starting time and ending time, and the up trains and down trains form a matched pair of trains. Each matched pair of trains Mx (i, j) includes a train i and a train j, and within a matching time $T_{match}$, one of the trains i and j leaves a station n while the other reaches the station n.

The maximum adjustable error $\Delta T_x$ is determined according to the shortest periods of time in which the trains i and j run respectively between stations, and the above shortest periods of time are related to the maximum train running speed, line speed limit, distance between stations, etc.

Step 2, tracking all running trains' states, selecting the matched pair of trains Mx (i, j) according to the current time, and determining whether the train i or j in the matched pair of trains Mx (i, j) has reached the station before the matching station n; if so, performing the following processing steps; otherwise, continuing to track all running trains' states.

Step 3, pre-estimating a matching error ΔT of the matched pair of trains Mx (i, j) in the current running situation.

Figure 3:
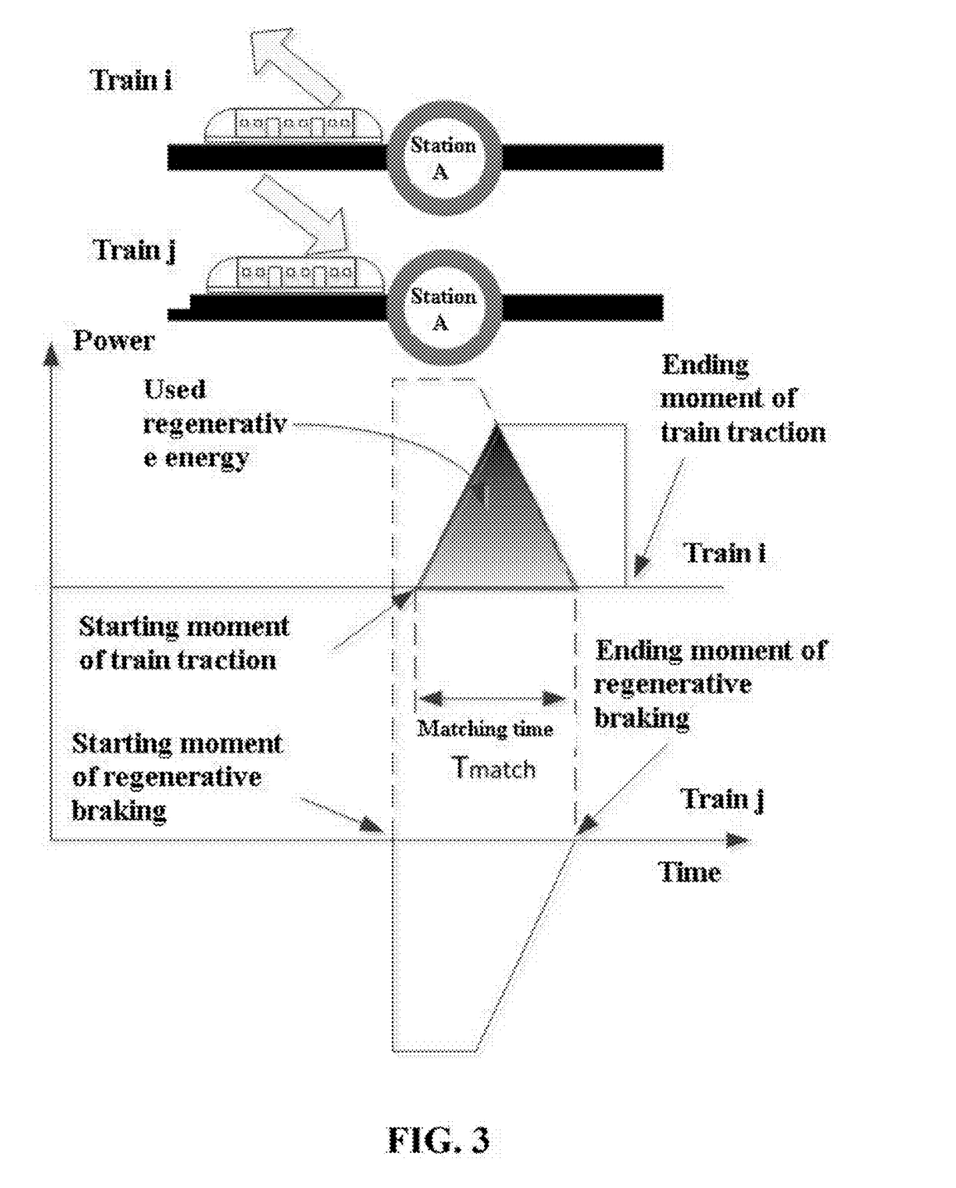
FIG. 3 is a schematic diagram of regenerative energy generated by a braking train j (negative power) being used by a train i (positive power) in a traction state as provided by an embodiment of the present invention.

In the case of modes 1 and 2, as shown in FIG. 3 which is a schematic diagram of regenerative energy generated by the braking train j (negative power) being used by the train i (positive power) in a traction state, the used regenerative energy can be represented by the shadowed part of the figure. At this time, a theoretical matching time $T_{match}$ of the matched pair of trains Mx (i, j) can be worked out based on planed train diagram data and the train running mode:

$$T_{match} = T_2 - T_1$$

where $T_2$ is the ending moment of regenerative braking of the reaching train, and $T_1$ is the starting moment of traction of the leaving train.

In the actual train running process, for example, the starting and ending moments of train braking and traction are not completely consistent with the planed train diagram. This inconsistency will lead to a deviation ΔT between the actual matching time and the theoretical matching time $T_{match}$.

$$\Delta T = T_{match} - T'_{match}$$

where is $T'_{match}$ the matching time of two matched trains at a matching station which is predicted according to the current actual running state of the matched pair of trains Mx (i, j).

Step 4, comparing the matching error Δt of the matched pair of trains Mx (i, j) in the current running situation with the preset maximum adjustable error $\Delta T_i$ of the matched pair of trains Mx (i, j); when Δt≤$\Delta T_i$, performing the following processing step; when Δt, ≤$\Delta T_i$ deleting the matched pair of trains Mx (i, j) from M, and not adjusting the train running of the matched pair of trains Mx (i, j).

Step 5, for an adjustable pair of trains, determining a strategy for adjusting train running of the matched pair of trains Mx (i, j) according to the deviation ΔT.

Repeatedly performing the above processing procedure until the processing of all matched pairs of trains is complete.

The deviation Δt may be adjusted through real-time adjustment of the mode of train running between stations, so as to reduce the deviation Δt as far as possible, preferably to 0. A train runs usually in 4 modes including traction, braking, uniform motion, and coasting. Since a train at the stages of braking and coasting does not absorb electric energy from a power supply network, and at the stage of uniform motion only absorbs a small amount of electric energy from the power supply network to overcome train running resistance, so that train traction energy consumption is consumed mainly in the stage of train traction. When the running mode is adjusted, changing the train traction process will lead to change in train traction energy consumption. That may cause total train running energy consumption not necessarily to be reduced. Therefore, as the basis for the present invention, the traction process of the leaving train is unchanged; instead, the running process of the reaching train is adjusted by changing the starting and ending moments of braking of the reaching train, and matching time is thus increased.

Figure 4:
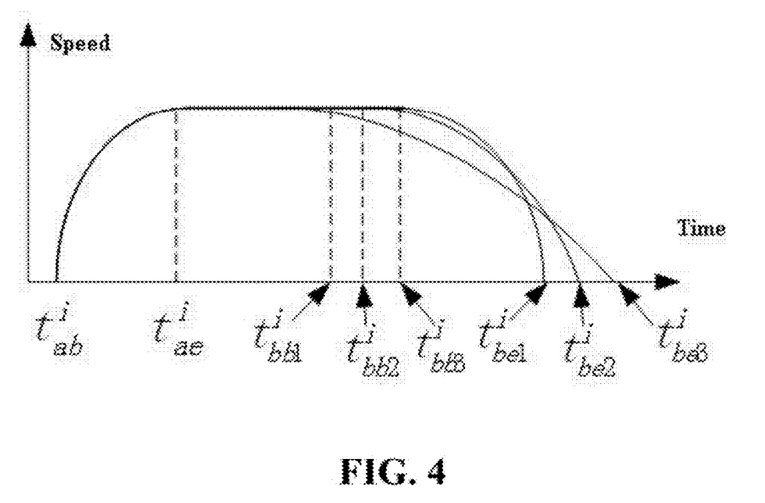
FIG. 4 is a schematic diagram of increasing matching time by adjusting the running process of a reaching train as provided by an embodiment of the present invention.

A schematic diagram of increasing matching time by adjusting the running process of the reaching train as provided by the embodiment of the present invention is as shown in FIG. 4.

The traction process of the leaving train in the current matched pair of trains Mx (i, j) is not adjusted, and instead the starting and ending moments of braking of the reaching train after adjustment are determined according to the matching error ΔT and the maximum adjustable error $\Delta T_x$.

The strategy for adjusting train control is based on a method of dynamic programming. The input variables of the method include: the current speeds, positions, line parameters (station spacing, gradient, curvature, and line speed limit), and train parameters (train traction characteristics, braking characteristics, and resistance parameters) of two trains in the matched pair of trains Mx (i, j), and the starting and ending moments of braking of the reaching train after adjustment. The output is a train running speed curve of the current matched pair of trains Mx (i, j) within the matching time, and that curve will be taken as a target curve for reference in the process of train running from the current station to the matching station. The train will run by tracking the target curve.

Particularly, it should be noted that the train running process is not necessarily adjusted when the deviation Δt exists. Since train running between stations is limited by the speed limit, train running speed cannot be increased infinitely, so that there is a minimum time for train running between given stations x. When matching with the originally matched train at the matching station cannot be achieved even when the pair of trains Mx (i, j) runs at the fastest speed, that pair of trains will not be adjusted.

Embodiment 2

Step 1: determining matched pairs of trains M={Mx, x=1, . . . , N} according to a planed train diagram and a train running mode, and presetting a maximum adjustable error $\Delta T_x$ of each matched pair of trains.

Step 2: at moment T0, a train i is about to set out to the next station, and the next station is a matching station x of the train i and a train j;

Step 3: selecting a matched pair of trains Mx (i, j) based on T0;

Step 4: pre-estimating a matching error ΔT of the matched pair of trains Mx (i, j) based on current train running speeds, positions, line speed limit, gradient, curvature, station spacing, train traction characteristics, braking characteristics, resistance parameters and the like.

Step 5: comparing the matching error ΔT with the maximum adjustable error $\Delta T_x$, and thus determining whether to adjust train running.

Step 6: for an adjustable matched pair of trains, determining a train running speed curve of the train i and train j in the pair of trains between the current station and matching station based on the method of dynamic programming.

In summary, in the present invention, a strategy for adjusting train running of the current matched pair of trains Mx (i, j) is determined according to the results of comparing the matching error ΔT with the preset maximum adjustable error $\Delta T_x$ by working out the matching error ΔT of the current matched pair of trains Mx (i, j) of the station in the current running situation. The present invention provides a train control method for maximizing utilization of regenerative energy, by which a strategy for adjusting train control may be produced in real time according to the train running situation, especially the deviation of the matched pair of trains, the train running speed curve of the matched pair of trains may thus be adjusted, and as a result the utilization of regenerative energy of the matched pair of trains may be maximized, so as to increase the utilization ratio of regenerative energy generated by train braking in urban rail transit and reduce the energy consumption of urban rail transit systems.

Those of ordinary skill in the art will be understood that the accompanying drawings are only a schematic of one embodiment, the modules or flows in the accompanying drawings are not necessarily mandatory for the implementation of the present invention.

Through the above descriptions of the implementations, those skilled in the art can clearly understand that the present invention may be implemented by software plus a necessary universal hardware platform. Based on this understanding, the technical solutions of the present invention in essence or the part contributing to the prior art may be embodied in the form of a software product. The computer software product may be stored in a storage medium, such as an ROM/RAM, a diskette, an optical disk or the like, and contain several instructions to instruct a computer device (for example, a personal computer, a server, a network device or the like) to execute the method in each embodiment or certain parts thereof in the present invention.

In the present specification, various embodiments are described in a progressive mode; the same or similar portions between the respective embodiments can refer to each other; the focus in each embodiment involves what is different from other embodiments. In particular, for device or system embodiments, due to being substantially similar to the method embodiments, they are described simply, and reference could be made to part of the illustration for the method embodiments. The above-described device and system embodiments are merely illustrative, wherein units illustrated as separate components may or may not be physically separated, components displayed as units may be or may not be physical units, i.e., may be located in one place, or may be distributed to multiple network units. Part or all of the modules can be selected according to actual needs to achieve the purpose of the solutions in the present embodiment. That can be understood and implemented by those of ordinary skill in the art without creative efforts.

The above-mentioned are only preferable specific implementations of the present invention; however, the protection scope of the present invention is not limited thereto. For any of those skilled who are familiar with the art, variations or substitutions can be easily thought of within the technical scope disclosed by the present invention, and these variations or substitutions should fall within the protection scope of the present invention. Therefore, the protection scope of the claims should prevail over the protection scope of the present invention.

What is claimed is:

1. A train control method for maximizing utilization of regenerative energy, comprising:
   determining a set of all matched pairs of trains M={Mx, x=1, . . . , N} according to a train diagram of each train, wherein each matched pair of trains Mx (i, j) comprises a train i and a train j, and within a matching time $T_{match}$, one of the train i and train j leaves a station n and performs an operation of traction while the other reaches the station n and performs an operation of braking;
   presetting the maximum adjustable error $\Delta T_x$ of each matched pair of trains according to the train diagrams of the train i and train j in each matched pair of trains Mx (i, j) and maximum running speeds of the train i and train j, wherein the maximum adjustable error $\Delta T_x$ is determined according to the shortest periods of time in which the trains i and j run respectively between stations;
   working out a matching error $\Delta T$ of a current matched pair of trains Mx (i, j) of a station in a current running situation; and
   comparing the matching error $\Delta T$ with the preset maximum adjustable error $\Delta T_x$ of the current matched pair of trains Mx (i, j) of the station, and determining a strategy for adjusting train running of the current matched pair of trains Mx (i, j) according to comparison results; and
   adjusting the current running situation of the current matched pair of trains Mx (i, j) according to the determined strategy for adjusting train running by adjusting a starting moment and an ending moment of braking of the reaching train.

2. The train control method for maximizing utilization of regenerative energy of claim 1, wherein the step of working out the matching error $\Delta T$ of the current matched pair of trains Mx (i, j) of the station in the current running situation comprises:
   working out a theoretical matching time $T_{match}$ of the current matched pair of trains Mx (i, j) of the station in the current running situation:

$$T_{match}=T_2-T_1$$

where $T_2$ is the ending moment of braking of the reaching train, and $T_1$ is a starting moment of traction of the leaving train; and
   working out a catching error $\Delta T$ between the matching time of the matched pair of trains Mx (i, j) and the theoretical matching time $T_{match}$ according to the current running situation of the matched pair of trains Mx (i, j):

$$\Delta T=T_{match}-T'_{match}$$

where $T'_{match}$ is the matching time of two matched trains at a matching station which is predicted according to a current actual running state of the matched pair of trains Mx (i, j).

3. The train control method for maximizing utilization of regenerative energy of claim 2, wherein the step of comparing the matching error $\Delta T_x$ with the preset maximum adjustable error $\Delta T$ of the current matched pair of trains Mx (i, j) of the station and determining the strategy for adjusting train running of the current matched pair of trains Mx (i, j) according to comparison results comprises:
   comparing the matching error of the matched pair of trains Mx (i, j) in the current running situation with the preset maximum adjustable error $\Delta T_x$ of the current matched pair of trains Mx (i, j) of the station, and when $\Delta T \leq \Delta T_i$, adjusting the running situation of the current matched pair of trains Mx (i, j) according to the determined strategy for adjusting train running; and
   when $\Delta T > \Delta T_i$, deleting the matched pair of trains Mx (i, j) from the set M, and not adjusting the train running of the matched pair of trains Mx (i, j).

4. The train control method for maximizing utilization of regenerative energy of claim 3, wherein the step of adjusting the running situation of the current matched pair of trains Mx (i, j) according to the determined strategy for adjusting train running further comprises:

outputting and applying a train running speed curve of the current matched pair of trains Mx (i, j) within the matching time according to the line parameters, train parameters and train diagram of the current matched pair of trains Mx (i, j), and the starting moment and ending moment of braking of the reaching train after adjustment.

\* \* \* \* \*

UNITED STATES PATENT AND TRADEMARK OFFICE
CERTIFICATE OF CORRECTION

PATENT NO. : 10,023,071 B2
APPLICATION NO. : 15/221737
DATED : July 17, 2018
INVENTOR(S) : Jing Xun et al.

It is certified that error appears in the above-identified patent and that said Letters Patent is hereby corrected as shown below:

In the Claims

Claim 2, Column 8, Line 34, replace "catching" with "matching".

Signed and Sealed this
Twenty-eighth Day of August, 2018

Andrei Iancu
*Director of the United States Patent and Trademark Office*